United States Patent [19]
Woolley

[11] Patent Number: 5,865,916
[45] Date of Patent: Feb. 2, 1999

[54] TRACTION ENHANCERS FOR IRRIGATION SYSTEMS

[76] Inventor: Walter L. Woolley, 1017 S. Haney, Spearman, Tex. 79081

[21] Appl. No.: 784,590

[22] Filed: Jan. 21, 1997

[51] Int. Cl.[6] .................................................. B60C 27/04
[52] U.S. Cl. ....................................... 152/225 R; 152/228
[58] Field of Search ............................... 152/223, 225 R, 152/225 C, 226, 227, 228; 301/43

[56] References Cited

U.S. PATENT DOCUMENTS

| | | | |
|---|---|---|---|
| D. 52,331 | 8/1918 | Loew | 152/228 X |
| 1,133,099 | 3/1915 | Clatt | 152/227 X |
| 1,213,949 | 1/1917 | Reger | 152/227 |
| 1,418,916 | 6/1922 | Groover | 152/225 C X |
| 1,572,821 | 2/1926 | Staggers | 152/228 |
| 1,602,317 | 10/1926 | Akers | 152/225 C X |
| 5,451,001 | 9/1995 | Kumm | 301/43 X |

FOREIGN PATENT DOCUMENTS 350846  6/1931  United Kingdom ................... 152/228

*Primary Examiner*—Russell D. Stormer
*Attorney, Agent, or Firm*—Royston, Rayzor, Vickery, Novak & Druce, L.L.P.

[57] ABSTRACT

A traction enhanced wheeled irrigation system. The traction enhanced irrigation system includes at least one rotary powered tire and wheel upon which at least a portion of a traction enhanced irrigation system travels across the ground. A traction enhancer includes an arched body having a substantially concave interior surface establishing an interior space for accommodating a portion of the tire of the irrigation system and a substantially convex exterior surface that faces away from the tire of the irrigation system when installed thereupon. A paddle extends outwardly from the convex exterior surface for engaging the ground as the tire rotates thereacross for resisting slippage of the tire on the ground.

17 Claims, 2 Drawing Sheets

TRACTION ENHANCERS FOR IRRIGATION SYSTEMS

FIELD OF THE INVENTION

This invention relates generally to irrigation systems carried on rollable wheel carriages. More specifically, the invention relates to rolling irrigation systems having a propensity to bog down in wetted ground.

BACKGROUND OF THE INVENTION

Irrigating systems are well known in the agricultural industry. Systems of different configurations are used to distribute needed water for planted and growing crops. In that many fields are extensive and irrigation water is need over the expanse of the property, irrigation systems are often rollingly mounted on wheeled carriage systems. These systems may be arranged for substantially linear and curved travel, or they may be oriented for circular or rotational travel. These rotational configurations are normally referred to as pivot irrigation systems.

Many times when water is applied to a field by an irrigation system the ground becomes muddy and can cause the wheeled carrying structures to become bogged down in the resulting mud. Primarily, this entrapment of the wheeled portions results from a significant loss of traction causing intended progress to be halted. Now in a substantially more slippery state since the irrigation water has been added, the mud prevents the tires of the carriages from achieving sufficient traction to progress the irrigation systems in the desired pattern. As a result, if undetected, this bogged situation is self-worsening in that the longer a distributing irrigation system remains still, the more water that is distributed to that particular location. As more water is added to the soil being turned by the rotating tires, the mud becomes more soupy and the carriages detrimentally dig further into the ground.

Present solutions for this bogging characteristic is for an operator to detect the bogged condition and cease operation of the water sprinklers. One or more operators must then travel to the bogged system and urge the sunken carriers from their self-perpetuating entrapment.

These bogging conditions prove disadvantageous in that those systems with a bogging propensity must be constantly monitored and their operation altered based upon conditions which are desirably eliminatable. The present invention has been developed to remedy the irrigation system's creation, entrapment in, and perpetuation of such bogged down conditions.

SUMMARY OF THE INVENTION

This invention includes features and/or components that have been invented and selected for their individual and combined benefits and superior performance as an irrigation system that has traction enhancement. Referring now to specific embodiments of the traction enhancer, additional benefits and advantageous features will be appreciated.

In one embodiment, the present invention is a traction enhancer for a wheeled irrigation system. The traction enhancer includes an arched body having a substantially concave interior surface establishing an interior space for accommodating a portion of a tire of an irrigation system and a substantially convex exterior surface that faces away from the tire of the irrigation system when installed thereupon. A paddle extends outwardly from the convex exterior surface for engaging the ground as the tire rotates thereacross for resisting slippage of the tire on the ground.

The paddle is oriented substantially perpendicularly to the arched body's convex exterior surface thereby assuring that the paddle engages the ground to the greatest extent or depth possible along the entire height of the paddle beyond the arched body.

In at least one embodiment, the arched body has an internal width appropriate to accommodate the treaded portion of the tire of the irrigation system with a clearance space therebetween. The paddle may optionally have a width greater than the arched body thereby increasing slip resistance that is generatable by the traction enhancer.

There is at least one brace connected between the arched body and the paddle for reinforcing the established orientation therebetween. In the illustrated embodiment, the brace(s) are oriented substantially perpendicularly to the convex exterior surface and to the paddle.

A securement is provided for coupling the traction enhancer upon the tire of the irrigation system. The securement includes at least one chain segment securable about a portion of the tire of the irrigation system. An extension plate is connected into a length of one of the chain segments for engaging a portion of the tire or wheel of the irrigation system.

Of the several possible chain segments, a first chain segment is attached to the arched body of the traction enhancer at one of two ends and a hook is provided at an end of that first chain segment opposite the attached end.

A second chain segment may be attached to the arched body of the traction enhancer at one of two ends with a hook receiver being provided at an end of the second chain segment opposite the attached end of the second chain segment for releasable engagement with the hook of the first chain segment.

In an alternative embodiment, the present invention is a traction enhanced wheeled irrigation system. The traction enhanced irrigation system includes at least one rotary powered tire and wheel upon which at least a portion of a traction enhanced irrigation system travels across the ground. A traction enhancer is installed upon the wheel and tire. The enhancer includes an arched body having a substantially concave interior surface establishing an interior space for accommodating a portion of the tire of the irrigation system and a substantially convex exterior surface that faces away from the tire of the irrigation system when installed thereupon. A paddle extends outwardly from the convex exterior surface for engaging the ground as the tire rotates thereacross for resisting slippage of the tire on the ground. In other respects, the traction enhancer is configured as described immediately hereinabove.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

Figure 1:
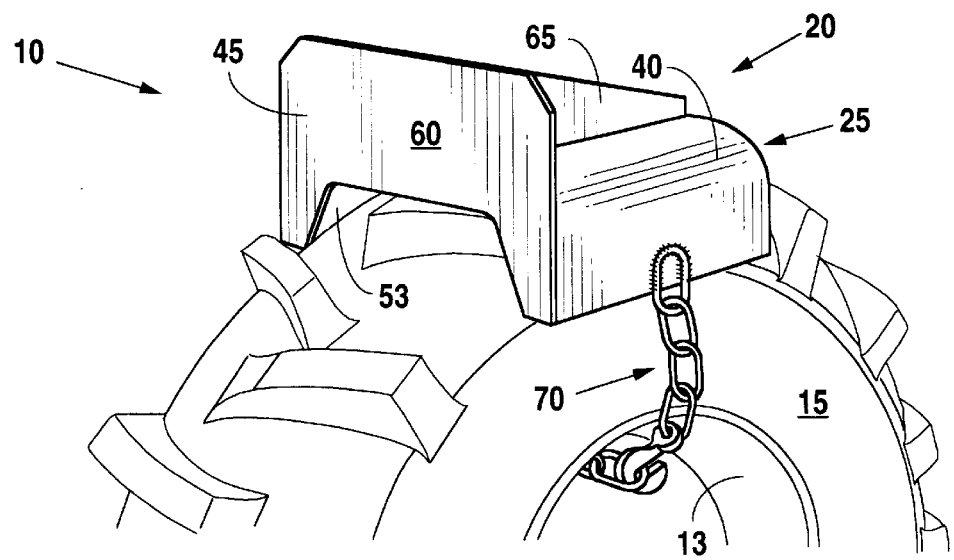
FIG. 1 is a perspective view of a single wheel and tire unit of an irrigation carrier system with a traction enhancer mounted thereupon according to one embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and not for purposes of limitation. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Certain components may be described as being adjacent to one another. In these instances, it is expected that such a relationship so described shall be interpreted to mean that the components are located proximate to one another, by not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

One embodiment of the traction enhancer 20 of the present invention is illustrated in FIG. 1 and is mounted upon a wheel 13 and tire 15 of a carriage or carrying structure that transports a traction enhanced wheeled irrigation system 10. It may be readily seen in this illustration that the traction enhancer 20 is suitably positioned upon the treaded portion of the tire 15 so that the enhancer 20 engages the ground as the tire 15 rotates. As previously described, the enhancer 20 is configured to increase the traction achieved by the wheeled system moving across the ground, and particularly in water saturated soils that have formed slippery mud.

Figure 2:
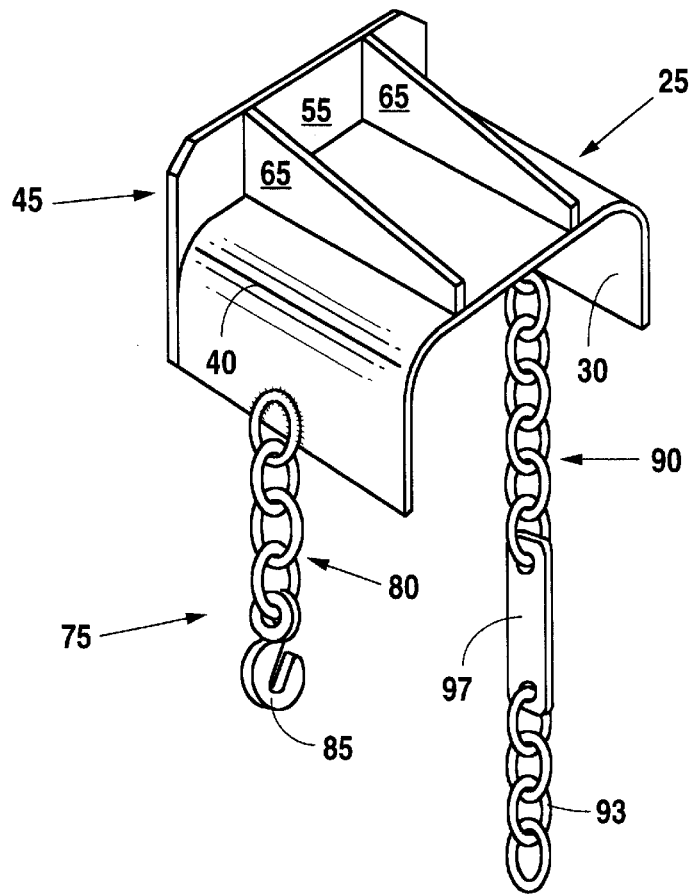
FIG. 2 is a prospective view of a single unit of the traction enhancer.

As may be best appreciated in FIG. 2 which is an illustration of the traction enhancer 20 alone, the arched body 25 is shown having a concave interior surface 30 and a convex exterior surface 40. The area within the interior surface 30 establishes an interior space 35. As shown in FIG. 1, the tire 15 is accommodated within this interior space 35. When the traction enhancer 20 is mounted upon the tire 15, it is oriented so that a paddle or flange 45 projects outwardly from the enhancer 20 at the exterior surface 40. In the preferred and illustrated embodiment, the paddle 45 extends substantially perpendicularly from the exterior surface 40 so that when mounted upon the tire 15 the paddle's 45 orientation is substantially outwardly radial with respect to wheel 13 and tire 15. As such, the paddle 45 establishes a paddle height 47 beyond the exterior surface 40 of the arched body 25. This paddle height 47 may be increased or decrease by design thereby establishing the depth or "dig" of the traction enhancer 20. When mounted upon the tire, the paddle height 47 projects directly into the ground when engaged therewith. The width of the paddle may be varied from a configuration wherein the paddle width is less than the width of the body 25 of the traction enhancer 20 (not shown), the paddle width may be equal to that of the body 25 as shown in FIG. 2, or the paddle width may be greater than the width of the arched body 25 as shown in FIG. 1. The width of the paddle 45 may be varied, but the interior width of the arched body 25 will normally be designed so that it is slightly greater than the width of the tire 15 upon which it is to be mounted. In this way, a clearance space 53 is established between the arched body 25 and the tire 15 when the tire 15 is mounted thereupon. The tolerance for variation between the body 25 and tire 15 is not specific, but should be reasonably close to facilitate substantially fixed location of the traction enhancer 20 upon the wheel 13 and tire 15.

As may best appreciated in FIG. 2, at least one brace 65 is provided and connected between the paddle 45 and the exterior surface 40 of the arched body 25. The brace 65 is connected to the paddle 45 at a braced surface 55 opposite to an exterior surface 60 of the paddle 45. The purpose of the brace 65 is to fortify the intended orientation between the paddle 45 and the arched body 25. In the illustration of the body 25, the braces 65, like the paddle 45, are perpendicular to the exterior surface 40. These are not required orientations, but do facilitate those portions' being projected into the ground.

Figure 3:
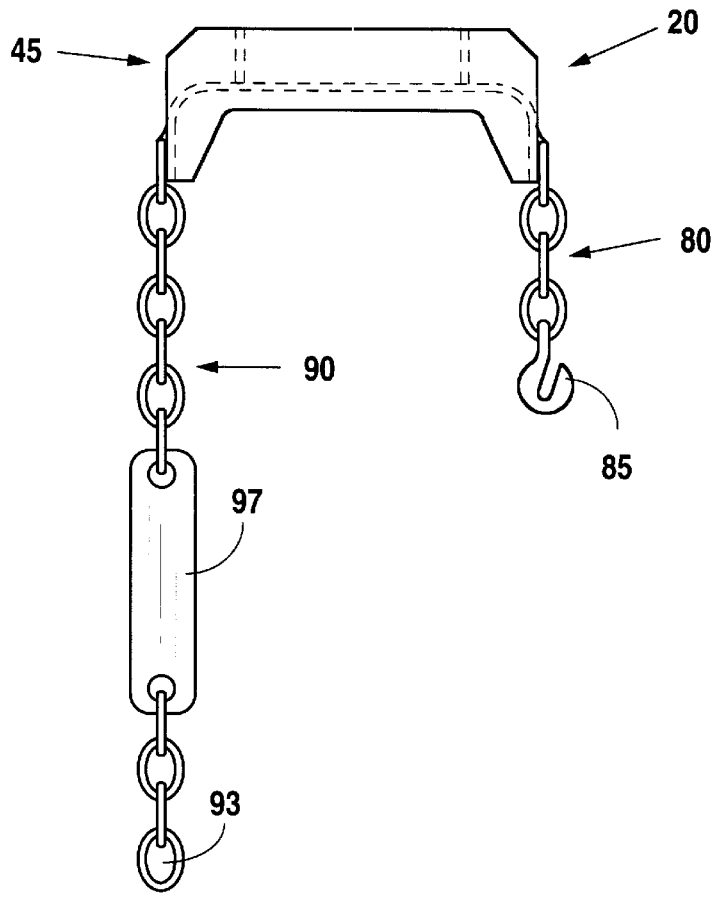
FIG. 3 is an elevational view of a traction enhancer with a chain securement coupled thereto.
Figure 5:
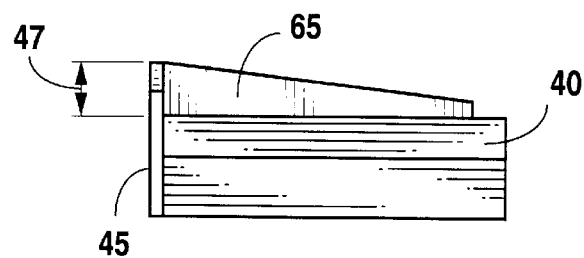
FIG. 5 is a side elevational view of the traction enhancer.
Figure 4:
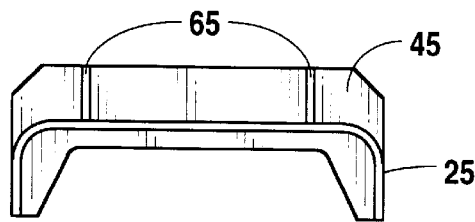
FIG. 4 is an elevational view of the traction enhancer facing toward a braced-side surface of the paddle.

A securement 70 is provided upon the arched body 25 in the form of chain segment 75. As may be best appreciated in FIGS. 2 and 3, the chain securement 75 includes a first chain 80 and a second chain 90. The second chain 90 has a greater length than the first chain 80 and incorporates a hook receiver 93 and an extension plate 97 in its length. The first chain 80 incorporates a hook 85 at a distal end from a connected end to the body 25. The greater length of the second chain segment 90 permits it to be wrapped underneath the wheel 13 and through a passage therethrough that may be established by radial spoke-type structures. Ultimately, the first chain segment 80 is releasably connected to the second chain segment 90. The releasable connection in the illustrated embodiment is achieved by placement of the hook 85 into the hook receiver 93 at distal ends of the respective chain segments 80,90. Each chain segment 80,90 is welded to the arched body 25 in the preferred embodiment.

Because of the hostile conditions within which the traction enhanced irrigation system 10 will normally be used, it is important that the traction enhancer 20 be constructed from a rigid and durable material. In a preferred embodiment, this construction material is steel which has been treated to be corrosion resistant. The arched body 25 and paddle 45 are constructed so as to be durable and able to resist extreme forces exerted during their use.

As a result of the traction enhancer 20 being mounted and included upon the tires 15 of an irrigation system, the irrigation system develops sufficient traction within muddy soils to prevent the rotating tires 15 from becoming bogged down and entrapped within the wetted ground. By their configuration, the traction enhancers 20 are intended to be mounted so that one or more unit may be included on a single tire 15. By adding several traction enhancing units, traction can be improved even further. In any event, the simple construction of the traction enhancer permits it to be easily manufactured and readily installed at the use site.

An irrigation system that is tractionally enhanced and components thereof has been described herein. This and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A traction enhancer for a wheeled irrigation system, said traction enhancer comprising:
    an arched body having a substantially concave interior surface establishing an interior space for accommodating a portion of a tire of an irrigation system and a substantially convex exterior surface that faces away from the tire of the irrigation system when installed thereupon, said arched body having a width at least as wide as the tire of the irrigation system, with a clearance space established between said arched body and the tire;
    a paddle extending outwardly from said convex exterior surface for engaging the ground as the tire rotates thereacross for resisting slippage of the tire on the ground;
    a securement for coupling said traction enhancer upon the tire of the irrigation system, said securement further comprising at least one chain segment securable about a portion of the tire of the irrigation system; and
    an extension plate connected into a length of said at least one chain segment for engaging a portion of the tire of the irrigation system.

2. The traction enhancer for a wheeled irrigation system as recited in claim 1; said traction enhancer further comprising:
    said paddle being oriented substantially perpendicularly to said arched body's convex exterior surface thereby assuring that said paddle engages the ground to the greatest extent possible along the entire height of said paddle beyond said arched body.

3. The traction enhancer for a wheeled irrigation system as recited in claim 1, said traction enhancer further comprising:
    said paddle having a width greater than said arched body thereby increasing slip resistance generated by said traction enhancer.

4. The traction enhancer for a wheeled irrigation system as recited in claim 1; said traction enhancer further comprising:
    at least one brace connected between said arched body and said paddle for reinforcing the established orientation therebetween.

5. The traction enhancer for a wheeled irrigation system as recited in claim 4; said traction enhancer further comprising:
    said at least one brace being oriented substantially perpendicularly to said convex exterior surface.

6. The traction enhancer for a wheeled irrigation system as recited in claim 5; said traction enhancer further comprising:
    said at least one brace being oriented substantially perpendicularly to said paddle.

7. The traction enhancer for a wheeled irrigation system as recited in claim 1, said traction enhancer further comprising:
    a first chain segment of said at least one chain segment being attached to said arched body of said traction enhancer at one of two ends; and
    a hook being provided at an end of said first chain segment opposite said attached end of said first chain segment.

8. The traction enhancer for a wheeled irrigation system as recited in claim 7; said traction enhancer further comprising:
    a second chain segment of said at least one chain segment being attached to said arched body of said traction enhancer at one of two ends; and
    a hook receiver being provided at an end of said second chain segment opposite said attached end of said second chain segment for releasable engagement with said hook of said first chain segment.

9. A traction enhanced wheeled irrigation system; said traction enhanced irrigation system comprising:
    at least one rotary powered tire and wheel upon which at least a portion of a traction enhanced irrigation system travels across the ground;
    a traction enhancer comprising an arched body having a substantially concave interior surface establishing an interior space for accommodating a portion of said tire of said irrigation system and a substantially convex exterior surface that faces away from said tire of said irrigation system when installed thereupon, said arched body having a width at least as wide as the tire of the irrigation system, with a clearance space established between said arched body and the tire; and
    a paddle extending outwardly from said convex exterior surface for engaging the ground as said tire rotates thereacross for resisting slippage of said tire on the ground.

10. The traction enhanced wheeled irrigation system as recited in claim 9; said traction enhancer further comprising:
    said paddle being oriented substantially perpendicularly to said arched body's convex exterior surface thereby assuring that said paddle engages the ground to the greatest extent possible along the entire height of said paddle beyond said arched body.

11. The traction enhanced wheeled irrigation system as recited in claim 9; said traction enhancer further comprising:
    at least one brace connected between said arched body and said paddle for reinforcing the established orientation therebetween.

12. The traction enhanced wheeled irrigation system as recited in claim 11; said traction enhancer further comprising:
    said at least one brace being oriented substantially perpendicularly to said convex exterior surface; and
    said at least one brace being oriented substantially perpendicularly to said paddle.

13. The traction enhanced wheeled irrigation system as recited in claim 9; said traction enhancer further comprising:

a securement for coupling said traction enhancer upon said tire of said irrigation system.

14. The traction enhanced wheeled irrigation system as recited in claim 13; said securement further comprising:

at least one chain segment securable about a portion of said tire of said irrigation system.

15. The traction enhanced wheeled irrigation system as recited in claim 14; said traction enhancer further comprising:

an extension plate connected into a length of said at least one chain segment for engaging a portion of said wheel of said irrigation system.

16. The traction enhanced wheeled irrigation system as recited in claim 14; said traction enhancer further comprising:

a first chain segment of said at least one chain segment being attached to said arched body of said traction enhancer at one of two ends; and a hook being provided at an end of said first chain segment opposite said attached end of said first chain segment.

17. The traction enhanced wheeled irrigation system as recited in claim 16; said traction enhancer further comprising:

a second chain segment of said at least one chain segment being attached to said arched body of said traction enhancer at one of two ends; and a hook receiver being provided at an end of said second chain segment opposite said attached end of said second chain segment for releasable engagement with said hook of said first chain segment.

* * * * *